United States Patent
Kishi

(10) Patent No.: US 11,594,787 B2
(45) Date of Patent: Feb. 28, 2023

(54) ELECTROSPINNING APPARATUS AND METHOD FOR MANUFACTURING SEPARATOR-INTEGRATED ELECTRODE

(71) Applicant: KABUSHIKI KAISHA TOSHIBA, Minato-ku (JP)

(72) Inventor: Toshiyuki Kishi, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 274 days.

(21) Appl. No.: 16/895,011

(22) Filed: Jun. 8, 2020

(65) Prior Publication Data
US 2021/0043905 A1 Feb. 11, 2021

(30) Foreign Application Priority Data
Aug. 8, 2019 (JP) .............................. JP2019-146380

(51) Int. Cl.
| | | |
|---|---|---|
| H01M 50/46 | (2021.01) | |
| H01M 10/0525 | (2010.01) | |
| D01D 5/00 | (2006.01) | |
| H01M 50/403 | (2021.01) | |

(52) U.S. Cl.
CPC .......... H01M 50/46 (2021.01); D01D 5/0084 (2013.01); H01M 10/0525 (2013.01); H01M 50/403 (2021.01)

(58) Field of Classification Search
CPC ... H01M 50/46; H01M 50/403; D01D 5/0084
USPC .......................... 429/122; 29/623.1; 264/467
See application file for complete search history.

(56) References Cited

U.S. PATENT DOCUMENTS

| | | | |
|---|---|---|---|
| 9,065,122 B2 | 6/2015 | Orilall et al. | |
| 2002/0007552 A1* | 1/2002 | Singleton | H01M 10/0413 29/730 |
| 2015/0162584 A1* | 6/2015 | Uematsu | H01M 50/46 429/211 |
| 2015/0372271 A1* | 12/2015 | Orilall | H01M 10/0525 429/246 |
| 2017/0191189 A1 | 7/2017 | Lust et al. | |
| 2018/0202074 A1 | 7/2018 | Uchida et al. | |

FOREIGN PATENT DOCUMENTS

JP 2018-80403 A 5/2018

* cited by examiner

*Primary Examiner* — Sean P Cullen
(74) *Attorney, Agent, or Firm* — Oblon, McClelland, Maier & Neustadt, L.L.P.

(57) ABSTRACT

According to one embodiment, an electrospinning apparatus deposits a fiber on an electrode. The apparatus includes a transport section and a fiber deposition section. The transport section transports electrodes. The fiber deposition section deposits the fiber on first and second surfaces of the electrodes. The electrodes include coated and uncoated portions. The transport section transports the electrodes in a third direction in the fiber deposition section. The electrodes include first and second electrodes. The first electrode is positioned at one end in the second direction and transported so that the uncoated portion of the first electrode protrudes toward the one end side. The second electrode is positioned at other end in the second direction and transported so that the uncoated portion of the second electrode protrudes toward the other end side.

5 Claims, 7 Drawing Sheets

ELECTROSPINNING APPARATUS AND METHOD FOR MANUFACTURING SEPARATOR-INTEGRATED ELECTRODE

CROSS-REFERENCE TO RELATED APPLICATIONS

This application is based upon and claims the benefit of priority from Japanese Patent Application No. 2019-146380, filed on Aug. 8, 2019; the entire contents of which are incorporated herein by reference.

FIELD

Embodiments described herein relate generally to an electrospinning apparatus and a method for manufacturing a separator-integrated electrode.

BACKGROUND

An electrospinning apparatus for depositing fine fibers on the surface of a member by an electrospinning method (also referred to as an electrospinning method or a charge induction spinning method) is known (JP 2018-80403 A (Kokai)). It is also known to manufacture a separator-integrated electrode by forming a separator by depositing fibers on an electrode using such an electrospinning apparatus. As described above, when the fibers are deposited on the electrode having the coated portion in which the electrode layer is coated on a part of the current collector layer by using the electrospinning apparatus, it is required to deposit the fibers with a uniform thickness on the coated portion of the electrode.

DETAILED DESCRIPTION

Figure 1:
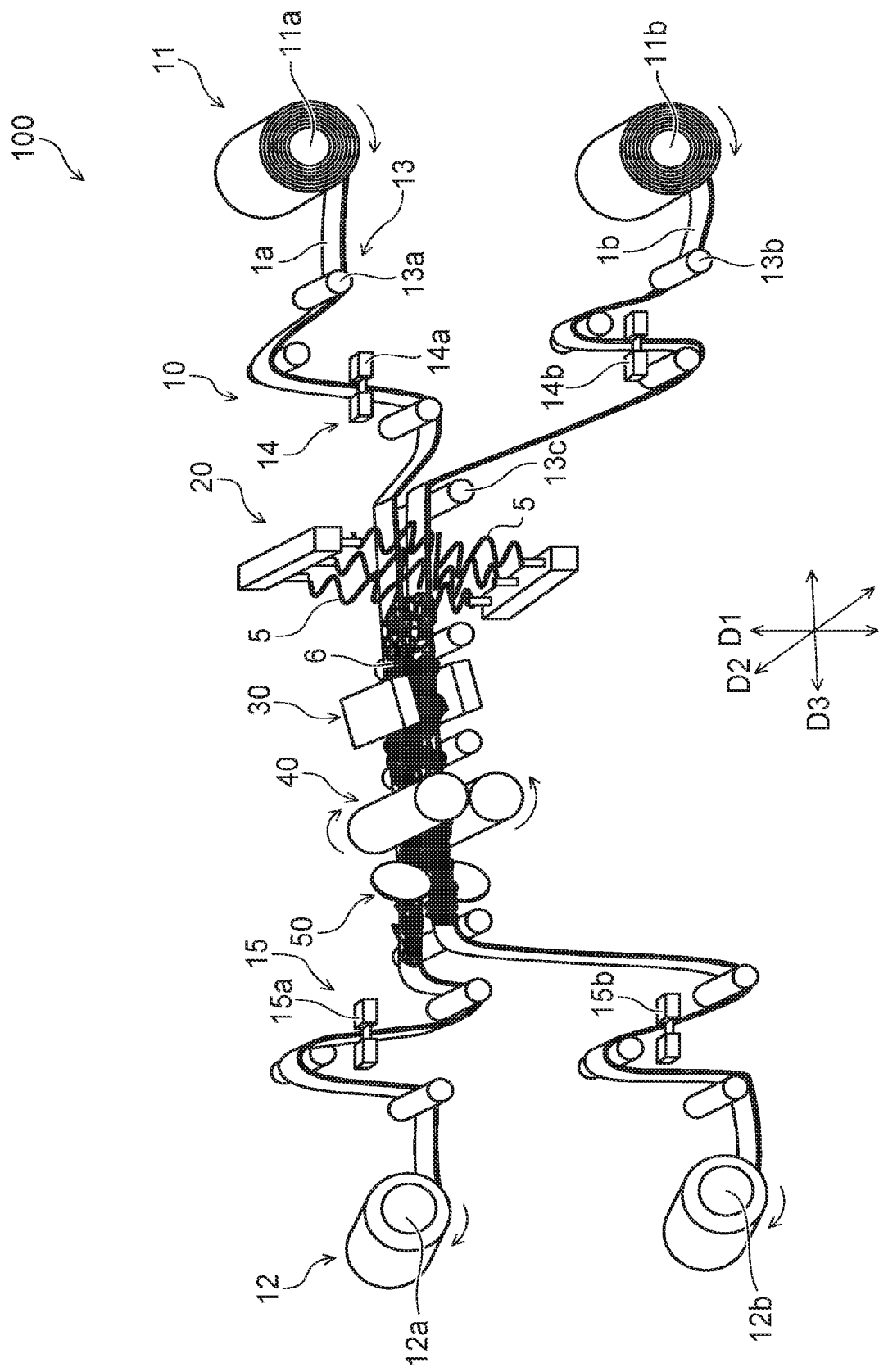
FIG. 1 is a schematic view illustrating an electrospinning apparatus according to an embodiment.

According to one embodiment, an electrospinning apparatus deposits a fiber on an electrode. The electrospinning apparatus includes a transport section and a fiber deposition section. The transport section transports a plurality of electrodes. The fiber deposition section deposits the fiber on a first surface and a second surface of the plurality of electrodes. The plurality of electrodes is transported by the transport section. The second surface faces an opposite side to the first surface. Each of the plurality of electrodes includes a first electrode layer, a second electrode layer, and a current collector layer. The first electrode layer includes the first surface. The second electrode layer includes the second surface. The current collector layer is positioned between the first electrode layer and the second electrode layer in a first direction. The first direction is perpendicular to the first surface and the second surface. The plurality of electrodes includes a coated portion and an uncoated portion. The current collector layer overlaps the first electrode layer and the second electrode layer in the first direction on the coated portion. The current collector layer does not overlap the first electrode layer and the second electrode layer in the first direction on the uncoated portion. The uncoated portion protrudes from the coated portion toward one side in a second direction. The second direction is orthogonal to the first direction. The transport section transports the plurality of electrodes in a third direction in the fiber deposition section. The third direction is orthogonal to the first direction and the second direction. The plurality of electrodes is arranged in the second direction. The plurality of electrodes includes a first electrode and a second electrode. The first electrode is positioned at one end in the second direction. The second electrode is positioned at other end in the second direction. The first electrode is transported so that the uncoated portion of the first electrode protrudes toward the one end side. The second electrode is transported so that the uncoated portion of the second electrode protrudes toward the other end side.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

FIG. 1 is a schematic view illustrating an electrospinning apparatus according to an embodiment.

Figure 2A:
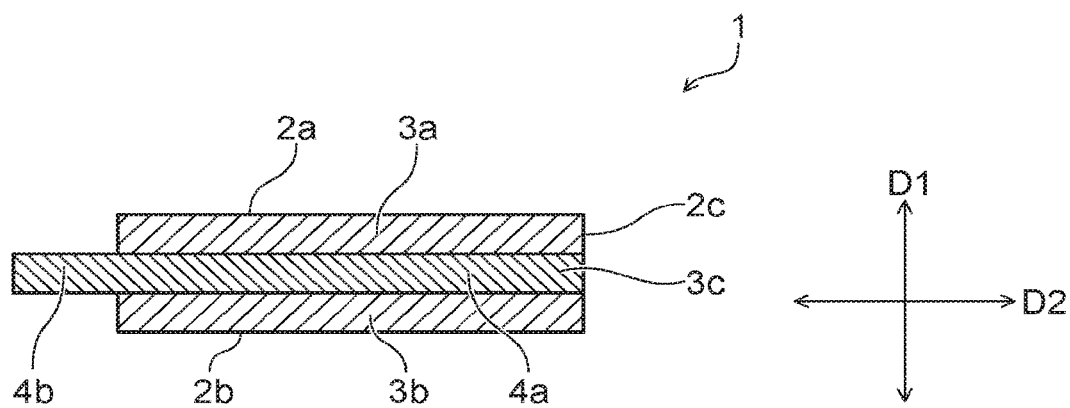
FIG. 2A and FIG. 2B are schematic views illustrating an electrode and a separator-integrated electrode.
Figure 2B:
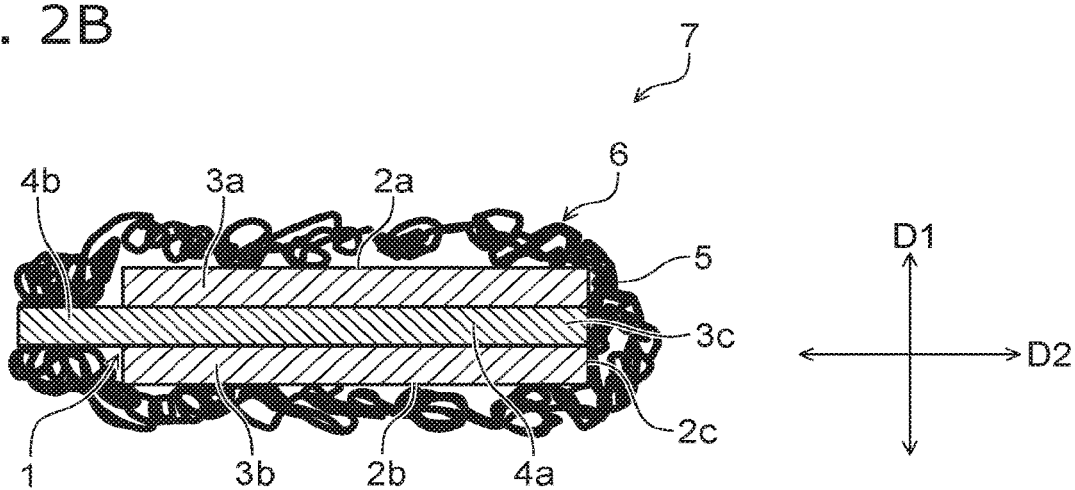

FIG. 2A and FIG. 2B are schematic views illustrating an electrode and a separator-integrated electrode.

As illustrated in FIG. 1, the electrospinning apparatus 100 according to the embodiment includes a transport section 10, a fiber deposition section 20, a drying section 30, a pressurizing section 40, and a cutting section 50. The electrospinning apparatus 100 forms a fiber film 6 by simultaneously depositing the fibers 5 on a plurality of electrodes 1 (in this example, the electrodes 1a and 1b).

The electrospinning apparatus 100 can be used, for example, as an apparatus for manufacturing a separator-integrated electrode 7 in which a fiber membrane 6 serving as a separator is formed on the electrode 1 (a manufacturing apparatus for a separator-integrated electrode). In addition, the electrospinning apparatus 100 can be used, for example, as an apparatus for manufacturing a lithium ion secondary battery using the separator-integrated electrode 7 (a lithium ion secondary battery manufacturing apparatus).

As shown in FIG. 2A, the electrode 1 on which the fibers 5 are deposited in the electrospinning apparatus 100 has a first surface 2a, a second surface 2b, and a third surface 2c. The second surface 2b is a surface opposite to the first surface 2a. The third surface 2c is a surface between the first surface 2a and the second surface 2b. In the specification, a direction perpendicular to the first surface 2a and the second surface 2b is referred to as a first direction D1. A direction orthogonal to the first direction D1 is referred to as a second direction D2. A direction orthogonal to the first direction D1 and the second direction D2 is referred to as a third direction D3.

The electrode 1 has a first electrode layer 3a, a second electrode layer 3b, and a current collector layer 3c. The first electrode layer 3a includes a first surface 2a. The second electrode layer 3b includes a second surface 2b. The current collector layer 3c is positioned between the first electrode layer 3a and the second electrode layer 3b in the first direction D1. The current collector layer 3c is exposed from between the first electrode layer 3a and the second electrode layer 3b on the third surface 2c.

The current collector layer 3c is a so-called current collector foil. The current collector layer 3c is made of, for example, an aluminum metal foil. The first electrode layer 3a and the second electrode layer 3b are so-called active material layers. The first electrode layer 3a and the second electrode layer 3b include, for example, an active material for a lithium ion secondary battery.

The electrode 1 has a coated portion 4a and an uncoated portion 4b. The coated portion 4a is a portion where the current collector layer 3c overlaps the first electrode layer 3a and the second electrode layer 3b in the first direction D1. The uncoated portion 4b is a portion where the current collector layer 3c does not overlap the first electrode layer 3a and the second electrode layer 3b in the first direction D1. In other words, a portion where the first electrode layer 3a or the second electrode layer 3b is provided on the surface of the current collector layer 3c is the coated portion 4a, and a portion where the first electrode layer 3a and the second electrode layer 3b are not provided on the surface of the current collector layer 3c is the uncoated portion 4b.

The uncoated portion 4b protrudes from the coated portion 4a toward one side in the second direction D2. More specifically, the uncoated portion 4b protrudes in the second direction D2 toward the side opposite to the third surface 2c. That is, the uncoated portion 4b is provided only at an end portion on the one side in the second direction D2, and is not provided at an end portion on the other side in the second direction D2.

As shown in FIG. 2B, the fiber 5 is deposited so as to cover the first surface 2a and the second surface 2b of the electrode 1. That is, the fiber film 6 is formed so as to cover the first surface 2a and the second surface 2b of the electrode 1. As will be described later, the third surface 2c of the electrode 1 is covered with the fiber 5 (the fiber film 6) deposited over two adjacent electrodes.

As shown in FIG. 1, the transport section 10 transports the plurality of electrodes 1. The transport section 10 transports the plurality of electrodes 1 by a roll-to-roll transport mechanism including an unwinding section 11 that unwinds the electrode 1 and a winding section 12 that winds the electrode 1. In this example, the transport section 10 includes a first unwinding section 11a, a first winding section 12a, a second unwinding section 11b, and a second winding section 12b. The transport section 10 transports the electrode 1a by unwinding the electrode 1a by the first unwinding section 11a and winding the electrode 1a by the first winding section 12a. The transport section 10 transports the electrode 1b by unwinding the electrode 1b by the second unwinding section 11b and winding the electrode 1b by the second winding section 12b. In the specification, the unwinding section 11 side is referred to as "upstream", and the winding section 12 side is referred to as "downstream".

In addition, the transport section 10 further includes a roller 13, a first position correction section 14, and a second position correction section 15. The roller 13 is rotatably provided between the unwinding section 11 and the winding section 12, and guides the transported electrode 1 in an appropriate direction. The roller 13 can adjust the position of the transported electrode 1 in the second direction D2, for example, by driving in the second direction D2.

The plurality of rollers 13 are provided, for example, between the unwinding section 11 and the winding section 12. The number of provided rollers 13 can be changed as appropriate. In this example, a roller 13a that guides the electrode 1a, a roller 13b that guides the electrode 1b, and a roller 13c that guides both the electrode 1a and the electrode 1b are provided. The roller 13c is provided around the fiber deposition section 20, the drying section 30, the pressurizing section 40, and the cutting section 50. The rollers 13a and 13b are provided upstream and downstream of the fiber deposition section 20, the drying section 30, the pressurizing section 40, and the cutting section 50. That is, in this example, in a part of the transport section 10, the electrode 1a and the electrode 1b are guided by the same roller 13 (the roller 13c). In the embodiment, the roller 13a and the roller 13b may be provided instead of the roller 13c. That is, the electrodes 1a and 1b may be guided by different rollers 13 (the rollers 13a and 13b) over the entire area of the transport section 10.

The first position correction section 14 is provided upstream of the fiber deposition section 20 and detects and corrects the position of the electrode 1 transported to the fiber deposition section 20. The first position correction section 14 includes, for example, a laser sensor that detects the position of the electrode 1 in the second direction D2. The first position correction section 14 corrects the position of the electrode 1 in the second direction D2 by driving the roller 13 and the unwinding section 11 positioned upstream of the first position correction section 14 in the second direction D2 based on the detection result of the laser sensor.

The first position correction section 14 is provided, for example, for each electrode. In this example, a first position correction section 14a for detecting and correcting the position of the electrode 1a and a first position correction section 14b for detecting and correcting the position of the electrode 1b are provided.

The second position correction section 15 is provided upstream of the winding section 12 and detects and corrects the position of the electrode 1 transported to the winding section 12. In this example, the second position correction section 15 is provided between the cutting section 50 and the winding section 12. The second position correction section 15 includes, for example, a laser sensor that detects the position of the electrode 1 in the second direction D2. The second position correction section 15 corrects the position of the electrode 1 in the second direction D2 by driving the roller 13 and the winding section 12 positioned downstream of the second position correction section 15 in the second direction D2 based on the detection result of the laser sensor.

The second position correction section 15 is provided, for example, for each electrode. In this example, a second position correction section 15a for detecting and correcting the position of the electrode 1a and a second position correction section 15b for detecting and correcting the position of the electrode 1b are provided.

The fiber deposition section 20 deposits the fiber 5 on the plurality of electrodes 1 transported by the transport section 10 to form a fiber film 6. The fiber deposition section 20 is provided upstream of the drying section 30. The fiber deposition section 20 will be described later.

The drying section 30 dries the fibers 5 (the fiber film 6) deposited on the plurality of electrodes 1 in the fiber deposition section 20. The drying section 30 includes, for example, a heater and dries the fiber 5 (the fiber film 6) by heating it. The drying section 30 is provided downstream of the fiber deposition section 20. In this example, the drying section 30 is provided between the fiber deposition section 20 and the pressurizing section 40.

The pressurizing section 40 pressurizes the plurality of electrodes 1 on which the fiber 5 (the fiber film 6) is deposited. The pressurizing section 40 is provided downstream of the drying section 30. In this example, the pressurizing section 40 is provided between the drying section 30 and the cutting section 50. The pressurizing section 40 may be provided downstream of the cutting section 50. The pressurizing section 40 will be described later.

The cutting section 50 cuts the fiber 5 (the fiber film 6) deposited over two adjacent electrodes 1. The two adjacent electrodes 1 are adjacent each other in the fiber deposition section 20. The cutting section 50 is provided downstream of the drying section 30. In this example, the cutting section 50 is provided downstream of the pressurizing section 40. The cutting section 50 may be provided between the drying section 30 and the pressurizing section 40. The cutting section 50 will be described later.

Figure 3:
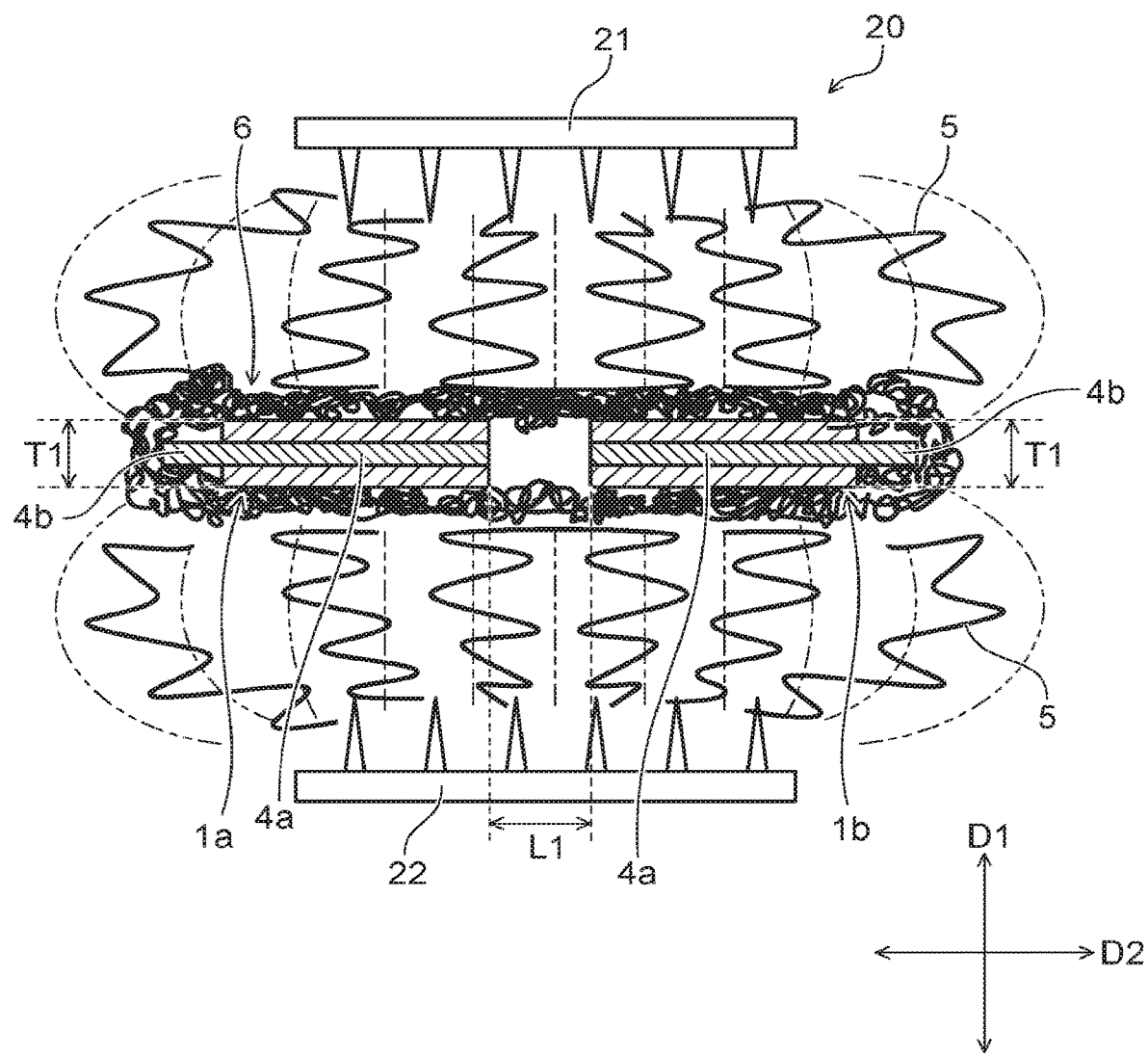
FIG. 3 is a schematic view illustrating a fiber deposition section of the electrospinning apparatus according to the embodiment.

FIG. 3 is a schematic view illustrating the fiber deposition section of the electrospinning apparatus according to the embodiment.

As illustrated in FIG. 3, the fiber deposition section 20 deposits the fiber 5 on the first surface $2a$ and the second surface $2b$ of the plurality of electrodes 1 transported by the transport section 10 to form the fiber film 6.

The fiber deposition section 20 includes a first nozzle 21 and a second nozzle 22. The first nozzle 21 ejects the fiber 5 toward the first surface $2a$ of the electrode 1. The second nozzle 22 ejects the fiber 5 toward the second surface $2b$ of the electrode 1. In the embodiment, the first nozzle 21 and the second nozzle 22 are provided at positions facing each other with the electrode 1 interposed therebetween. The first nozzle 21 and the second nozzle 22 do not have to face each other as long as they are provided on opposite sides of the electrode 1. The electrode 1 is transported, for example, so as to be positioned between the first nozzle 21 and the second nozzle 22 in the first direction D1.

The first nozzle 21 and the second nozzle 22 are respectively connected to a pump (not shown) for supplying a polymer compound solution serving as a material of the fiber 5 to the first nozzle 21 or the second nozzle 22, and a power supply (not shown) for applying a voltage to the first nozzles 21 or the second nozzle 22. The first nozzle 21 and the second nozzle 22 eject the fiber 5 by applying the voltage from the power supply to the polymer compound solution supplied from the pump.

As illustrated in FIG. 1 and FIG. 3, in the fiber deposition section 20, the transport section 10 arranges the plurality of electrodes 1 in the second direction D2 and transports the plurality of electrodes 1 in the third direction D3. More specifically, in the fiber deposition section 20, the transport section 10 transports the plurality of electrodes 1 side by side so that the respective first surfaces $2a$ of the plurality of electrodes 1 face in the same direction and the respective second surface $2b$ of the plurality of electrodes 1 face in the same direction. In this example, in the fiber deposition section 20, the transport section 10 transports the electrode $1a$ and the electrode $1b$ arranged in the second direction D2.

The plurality of electrodes 1 includes a first electrode and a second electrode. The first electrode is positioned at one end in the second direction D2. The second electrode is positioned at other end in the second direction D2. In the fiber deposition section 20, the transport section 10 transports the first electrode and the second electrode side by side so that the uncoated portion $4b$ of the first electrode protrudes toward the one end side and the uncoated portion $4b$ of the second electrode protrudes toward the other end side. In other words, in the fiber deposition section 20, the transport section 10 transports two electrodes with the uncoated portions $4b$ of the two electrodes positioned at both ends in the second direction D2 facing outward. In this example, the electrode $1a$ is the first electrode and the electrode $1b$ is the second electrode. In the fiber deposition section 20, the transport section 10 transports the electrode $1a$ and the electrode $1b$ with the uncoated portion $4b$ of the electrode $1a$ and the uncoated portion $4b$ of the electrode $1b$ facing outward.

The transport section 10 transports the plurality of electrodes 1 side by side so that the fibers 5 are deposited over two adjacent electrodes in the fiber deposition section 20. The transport section 10 transports the plurality of electrodes 1 side by side so that a distance L1 between each two adjacent electrodes is the same. In this example, the distance L1 between the two adjacent electrodes is the distance between the electrode $1a$ and the electrode $1b$.

If the distance L1 between the two adjacent electrodes is too large, the fibers 5 are deposited in a space between the two adjacent electrodes, and it becomes impossible to deposit the fibers 5 over the two adjacent electrodes. Therefore, the upper limit of the distance L1 between the two adjacent electrodes is a distance that can form the fibers 5 over the two adjacent electrodes.

The distance which the fibers 5 can be formed over the two adjacent electrodes is determined according to, for example, the electric field strength in the fiber deposition section 20. The electric field strength in the fiber deposition section 20 is determined according to the distance between the first nozzle (the second nozzle 22) and the electrode, the applied voltage to the first nozzle 21 (the second nozzle 22), the voltage of the electrode, the charge amount of the fibers 5, and the distance between the device housing and the fiber deposition section 20 or the like. Therefore, the upper limit of the distance L1 between the two adjacent electrodes can be obtained experimentally or by simulation according to these conditions. The upper limit of the distance L1 between the two adjacent electrodes is, for example, about 150 mm.

In addition, for example, the transport section 10 transports the plurality of electrodes side by side so that the distance L1 between the two adjacent electrodes is the same as the thickness T1 of the plurality of electrodes 1 or larger than the thickness T1 of the plurality of electrodes 1. Each of the plurality of electrodes 1 has the same thickness T1. The thickness T1 is the length of the electrode 1 in the first direction D1. The thickness T1 is the sum of the length of the first electrode layer $3a$ in the first direction D1, the length of the second electrode layer $3b$ in the first direction D1, and the length of the current collector layer $3c$ in the first direction D1.

Figure 4A:
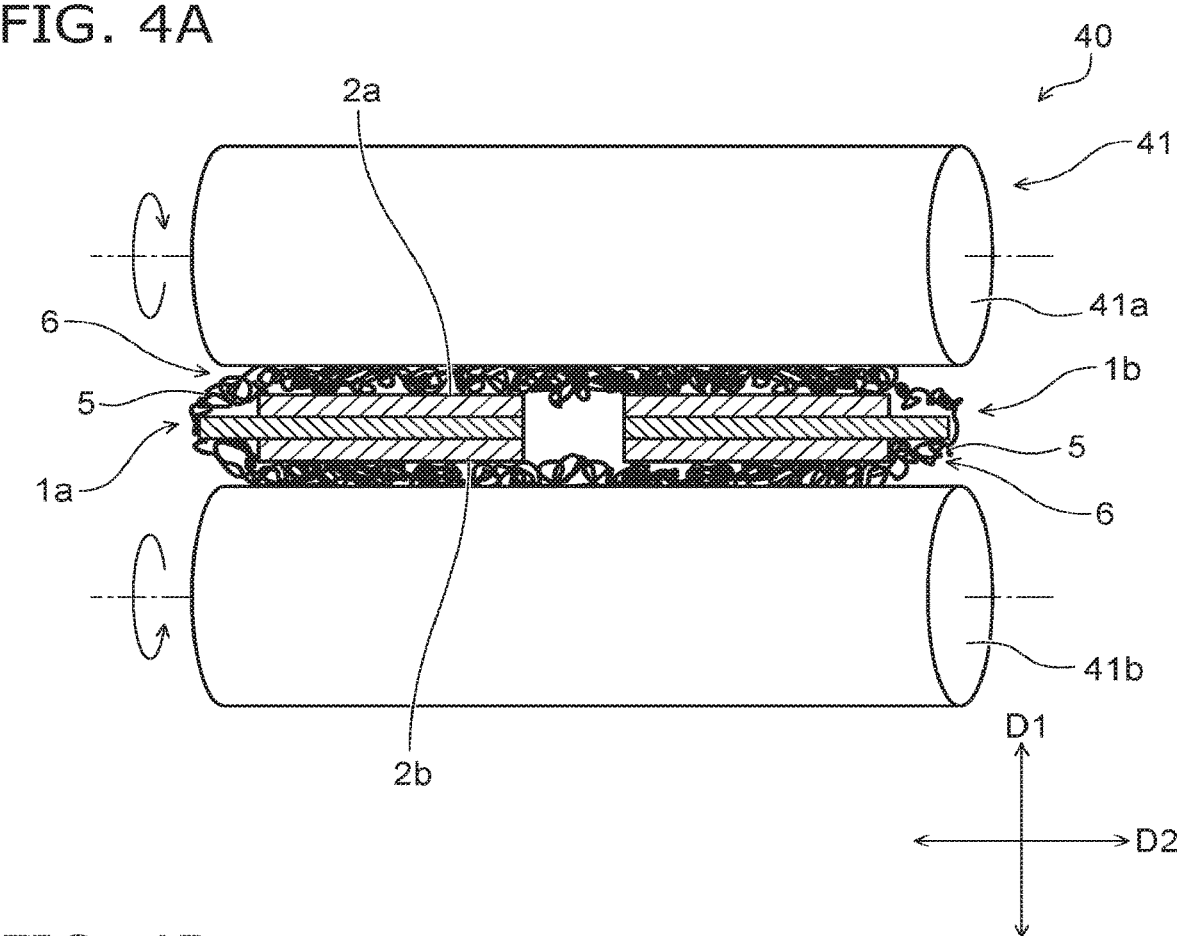
FIG. 4A and FIG. 4B are schematic views illustrating a pressurizing section of the electrospinning apparatus according to the embodiment.
Figure 4B:
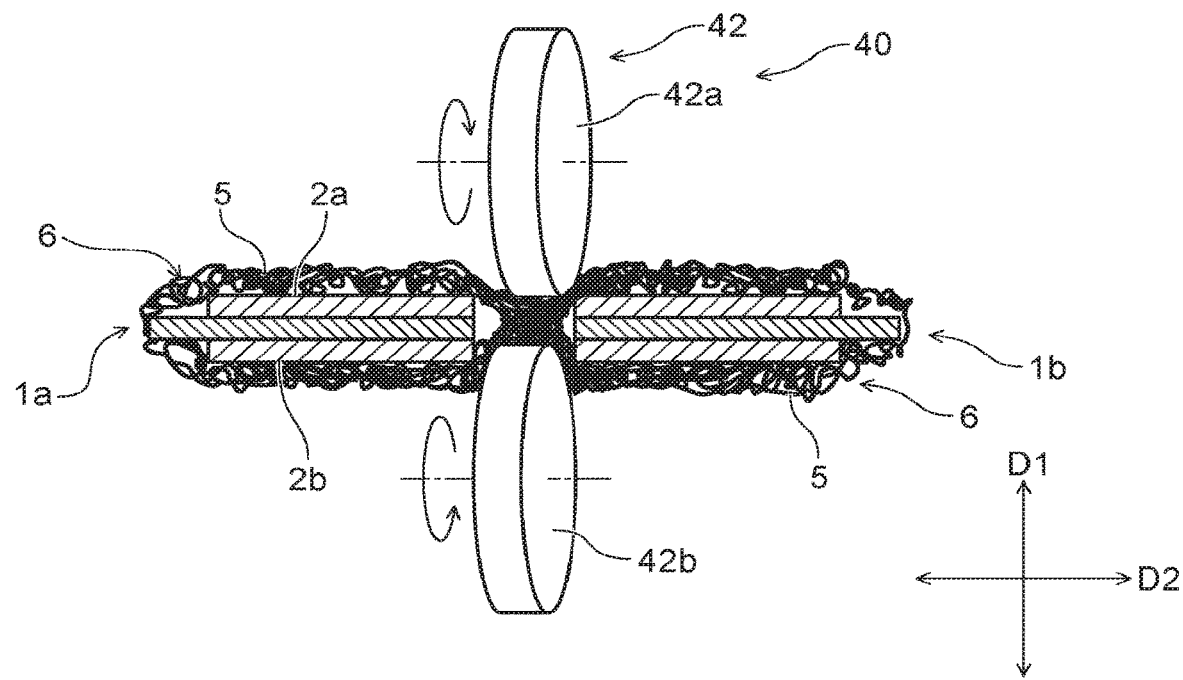

FIG. 4A and FIG. 4B are schematic views illustrating the pressurizing section of the electrospinning apparatus according to the embodiment.

As illustrated in FIG. 4A, the pressurizing section 40 includes a pair of or more press rollers 41 that sandwich at least one of the plurality of electrodes 1. In this example, the pressurizing section 40 includes a press roller $41a$ and a press roller $41b$ (first press rollers). The press roller $41a$ is provided on the first surface $2a$ side of the electrode $1a$ and the electrode 1*b*. The press roller 41*b* is provided on the second surface 2*b* side of the electrode 1*a* and the electrode 1*b*. The press roller 41*a* and the press roller 41*b* rotate in a direction of the arrow while sandwiching the electrode 1*a* and the electrode 1*b* on which the fiber 5 is deposited, so that the electrode 1*a* and the electrode 1*b* on which the fibers 5 are deposited are pressurized from the first surface 2*a* side and the second surface 2*b* side. Note that the pair of press rollers 41 sandwiching the electrode 1*a* and the pair of press rollers 41 sandwiching the electrode 1*b* may be provided separately. That is, the pair of press rollers 41 may be provided for each electrode.

Further, as shown in FIG. 4B, the pressurizing section 40 may further include a pair or more of press rollers 42 that sandwich the fibers 5 that are deposited over the two adjacent electrodes. In this example, the pressurizing section 40 includes a press roller 42*a* and a press roller 42*b* (second press rollers). The press roller 42*a* is positioned between the electrode 1*a* and the electrode 1*b* in the second direction D2 and provided on the first surface 2*a* side. The press roller 42*b* is positioned between the electrode 1*a* and the electrode 1*b* in the second direction D2 and provided on the second surface 2*b* side. The press roller 42*a* and the press roller 42*b* rotate in a direction of the arrow while sandwiching the fibers 5 deposited over the electrode 1*a* and the electrode 1*b*, so that the fibers 5 deposited over the electrode 1*a* and the electrode 1*b* are pressurized from the first surface 2*a* side and the second surface 2*b* side. Thereby, the side surfaces (the third surface 2*c*) of the electrodes 1*a* and 1*b* can be covered by the fibers 5 deposited over the electrode 1*a* and the electrode 1*b*.

The press roller 42 is provided, for example, downstream of the press roller 41. The press roller 42 may be provided at a position overlapping the press roller 41 in the second direction D2. That is, the press roller 42 may pressurize the fibers 5 deposited over the electrode 1*a* and the electrode 1*b* at the same time as the press roller 41 pressurizes the electrode 1*a* and the electrode 1*b*. The press roller 42 is provided as needed and can be omitted.

Figure 5:
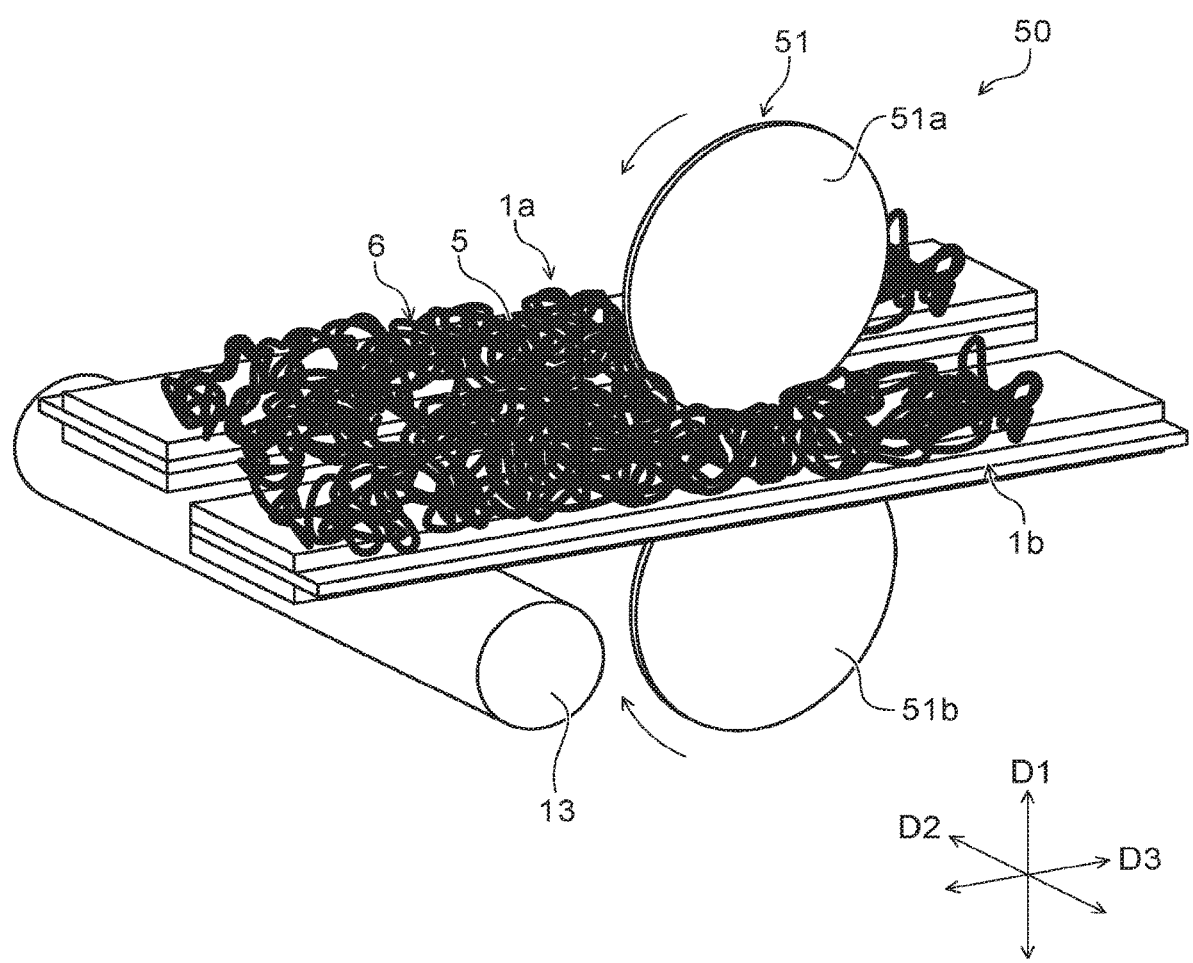
FIG. 5 is a schematic view illustrating a cutting section of the electrospinning apparatus according to the embodiment.

FIG. 5 is a schematic view illustrating a cutting section of the electrospinning apparatus according to the embodiment.

As illustrated in FIG. 5, the cutting section 50 includes, for example, a cutter 51 that cuts the fibers 5 that are deposited over the two adjacent electrodes in the fiber deposition section 20. In this example, the cutting section 50 includes a cutter 51*a* provided on the first surface 2*a* side and a cutter 51*b* provided on the second surface 2*b* side. The cutter 51*a* and the cutter 51*b* rotate in a direction of the arrow while sandwiching the fibers 5 deposited over the electrode 1*a* and the electrode 1*b*, and thereby the fibers 5 deposited over the electrode 1*a* and the electrode 1*b* are cut from the first surface 2*a* side and the second surface 2*b* side.

The cutting section 50 may include, for example, one cutter 51 penetrating from the first surface 2*a* side to the second surface 2*b* side. In addition, the blade of the cutter 51 is not particularly limited as long as it can cut the fibers 5, but is preferably, for example, saw-tooth shaped. If the blade of the cutter 51 has a saw-tooth shape, the cut fibers 5 are easily entangled with each other.

In addition, the cutting section 50 may include a mechanism that cuts the fibers 5 deposited over the two adjacent electrodes by a laser beam instead of the cutter 51, or a mechanism that cuts the fibers 5 deposited over the two adjacent electrodes by a metal hot wire.

Further, as described above, the cutting section 50 may be provided between the drying section 30 and the pressurizing section 40. In this case, at the time when the fibers 5 deposited over the two electrodes are cut by the cutting section 50, the fibers 5 are not adhered to the side surface (the third surface 2*c*) of the electrode. Since the fibers 5 immediately after being deposited in the fiber deposition section 20 are charged, for example, when the time required for cutting the fibers 5 deposited in the fiber deposition section 20 by the cutting section 50 is short, the cut fibers 5 adhere to the side surface (the third surface 2*c*) of the electrode by an electrostatic force, when cutting the fibers 5 that have been deposited over the two electrodes. On the other hand, when the time required for cutting the fibers 5 deposited in the fiber deposition section 20 by the cutting section 50 is long, the cut fibers 5 are unlikely to adhere to the side surface (the third surface 2*c*) of the electrode. Therefore, in this case, for example, it is preferable that the fibers 5 are cut by the cutting section 50 and then blown to the vicinity of the cutting section 50 to cause the cut fibers 5 to adhere to the side surface (the third surface 2*c*) of the electrode.

Hereinafter, a method for manufacturing the separator-integrated electrode according to the embodiment will be described.

Figure 6:
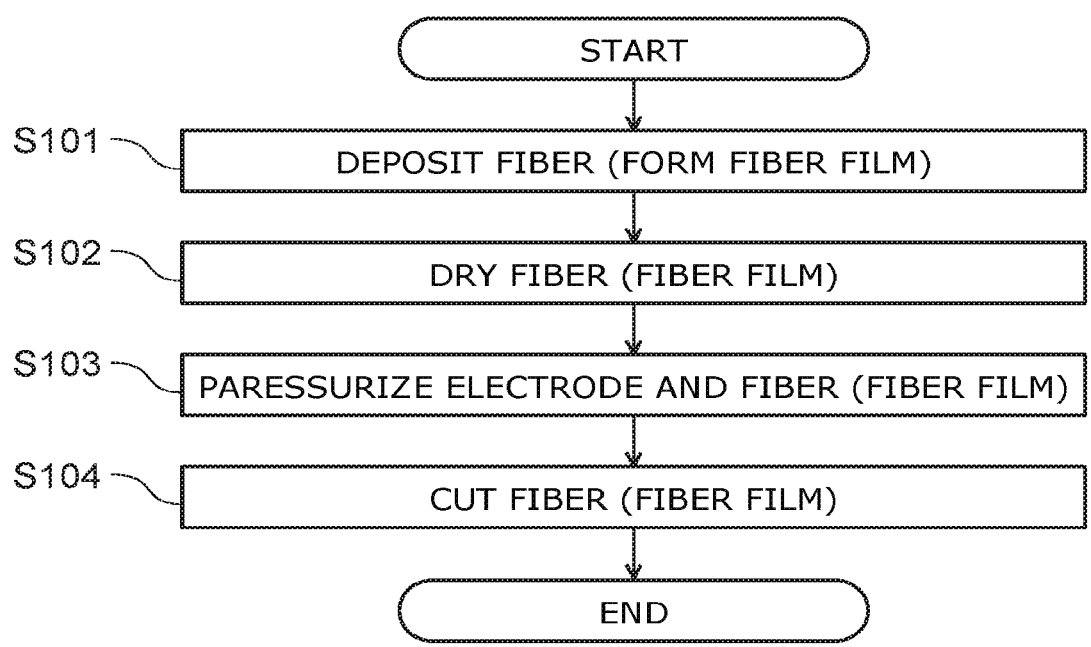
FIG. 6 is a flow chart illustrating one example of a method for manufacturing a separator-integrated electrode according to the embodiment.

FIG. 6 is a flow chart illustrating one example of a method for manufacturing the separator-integrated electrode according to the embodiment.

As illustrated in FIG. 6, in the method for manufacturing the separator-integrated electrode according to the embodiment, first, in the fiber deposition section 20 illustrated in FIG. 3, the fiber film 6 serving as the separator is formed by depositing fibers 5 on the first surface 2*a* and the second surface 2*b* of the plurality of electrodes (Step S101).

At this time, the fibers 5 are deposited while arranging the plurality of electrodes 1 in the second direction D2 and transporting the plurality of electrodes 1 in the third direction D3. At this time, the fiber film 6 is formed while transporting the first electrode and the second electrode side by side so that the uncoated portion 4*b* of the first electrode (for example, the electrode 1*a*) protrudes toward the one end side and the uncoated portion 4*b* of the second electrode (for example, the electrode 1*b*) protrudes toward the other end side. At this time, the fibers 5 are deposited while transporting the plurality of electrodes 1 side by side so that the fiber film 6 is formed over the two adjacent electrodes 1 in the fiber deposition section 20.

Next, in the drying section 30 illustrated in FIG. 1, the fibers 5 (fiber films 6) deposited on the plurality of electrodes 1 are dried (Step S102).

Next, in the pressurizing section 40 illustrated in FIG. 4A and FIG. 4B, the plurality of electrodes 1 on which the fibers 5 (the fiber films 6) are deposited are pressurized (Step S103). At this time, as described above, the fibers 5 deposited over the two adjacent electrodes may be pressurized.

Further, in the cutting section 50 illustrated in FIG. 5, the fibers 5 deposited over the two adjacent electrodes are cut (step S104). Step S104 may be performed after step S102 and before step S103. As described above, a separator-integrated electrode can be manufactured, in which the separator (the fiber film 6) is formed on the first surface 2*a*, the second surface 2*b*, and the third surface 2*c* of the electrode 1.

Hereinafter, effects of the electrospinning apparatus 100 according to the embodiment and the method for manufacturing the separator-integrated electrode according to the embodiment will be described.

When fibers are deposited on an electrode using an electrospinning apparatus, the fibers spread along an electric field, and thus the fibers are likely to wrap around at both end portions of the electrode to be deposited thickly. If the fibers are thickly deposited on the coated portion of the electrode, the internal stress may increase and the electrode may be extended when the electrode is wound. If the electrodes are extended, the transport in the winding process will not be stable, which will cause variations in battery performance.

Then, in the embodiment, in the fiber deposition section 20, the fibers 5 are deposited while arranging the plurality of electrodes 1 in the second direction D2 and transporting the plurality of electrodes 1 in the third direction D3. At this time, the fibers 5 are deposited while transporting the first electrode and the second electrode side by side so that the uncoated portion 4b of the first electrode protrudes toward the one end side and the uncoated portion 4b of the second electrode protrudes toward the other end side.

Thereby, as illustrated in FIG. 3, it is possible to suppress the fibers 5 from wrapping around and being deposited in the coated portion 4a of the electrode. Therefore, it is possible to suppress the fibers 5 from being deposited thickly on the coated portion 4a of the electrode, and to deposit the fibers 5 with a uniform thickness on the coated portion 4a of the electrode. Thereby, the transport in the winding process can be stabilized, and variation in battery performance can be suppressed. Further, since the fibers 5 can be simultaneously deposited on the plurality of electrodes 1, productivity can be improved.

In addition, since the uncoated portion 4b is a portion that does not overlap when the electrode 1 is wound, even if the fibers 5 are deposited thickly on the uncoated portion 4b, there is no possibility that the electrode is extended. Further, since the fibers 5 deposited on the uncoated portion 4b are removed in a later process, there is no need to deposit the fibers 5 on the uncoated portion 4b with the same thickness as the coated portion 4a.

As a method of depositing the fiber with a uniform thickness on the electrode, for example, a method of depositing the fibers on one electrode having uncoated portions at both ends, and simultaneously cutting the electrode and the fiber after depositing the fiber is considered. However, in this method, the cut surface of the electrode (the side surface on the side of the coated portion) cannot be covered with the fiber. Therefore, there is a possibility that the side surface on the side of the coated portion comes into contact with a positive electrode to cause insulation failure.

On the other hand, in the embodiment, the plurality of electrodes 1 are arranged and transported so that the fibers 5 are deposited over the two adjacent electrodes in the fiber deposition section 20. Thus, the fibers 5 can be deposited over the two adjacent electrodes.

Further, in the embodiment, the cutting section for cutting the fibers 5 deposited over the two adjacent electrodes is provided. Therefore, the fibers 5 deposited over the two adjacent electrodes can be cut, and the plurality of electrodes 1 on which the fibers 5 are deposited can be individually wound.

In the embodiment, the fibers 5 are deposited while transporting the plurality of electrodes 1 side by side so that the distance L1 between the two adjacent electrodes is the same as the thickness T1 of the plurality of electrodes 1 or more than the thickness T1 of the plurality of electrodes 1. Thereby, when the fibers 5 deposited over the two adjacent electrodes are cut, the fibers 5 can cover the side surface (the third surface 2c) of the electrode on the coated portion 4a side. Therefore, it is possible to suppress the occurrence of insulation failure due to the third surface 2c coming into contact with the positive electrode.

Further, in the embodiment, the pressurizing section 40 for pressurizing the plurality of electrodes 1 on which the fibers 5 are deposited is provided. Thereby, the fibers 5 can be fixed to the electrode 1.

In the embodiment, a position correction section (the first position correction section 14) that corrects the positions of the plurality of electrodes 1 transported to the fiber deposition section 20 is provided in the transport section 10. Thereby, the distance L1 between the two adjacent electrodes can be controlled.

Figure 7:
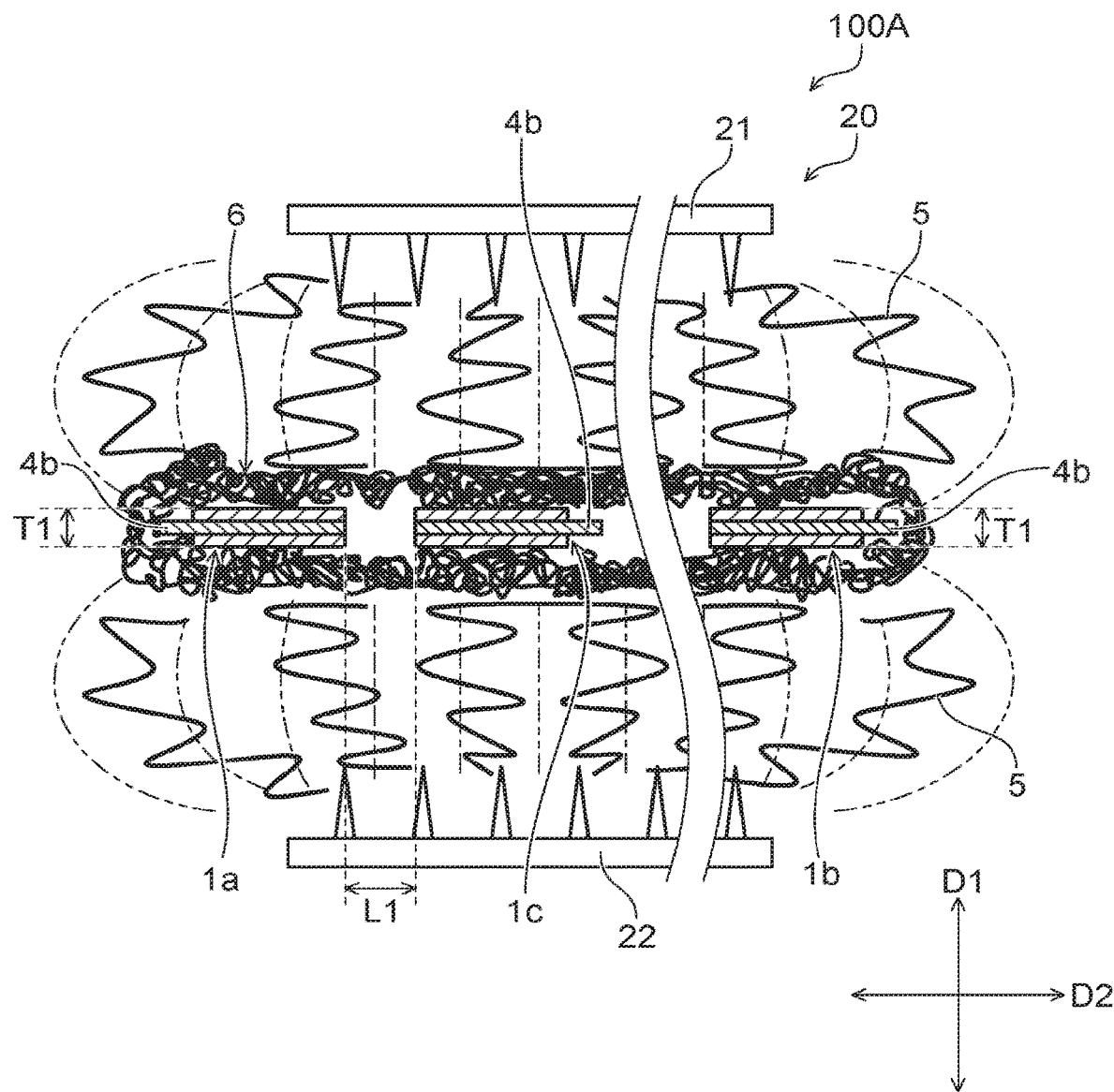
FIG. 7 is a schematic view illustrating a fiber deposition section of an electrospinning apparatus according to a modification of the embodiment.

FIG. 7 is a schematic view illustrating a fiber deposition section of an electrospinning apparatus according to a modification of the embodiment.

As shown in FIG. 7, in the electrospinning apparatus 100A according to the modification of the embodiment, the fibers 5 are deposited while transporting three or more electrodes 1 side by side in the second direction D2.

Also in this example, the transport section 10 transports the first electrode (the electrode 1a) and the second electrode (the electrode 1b) side by side so that the uncoated portion 4b of the first electrode (the electrode 1a) protrudes toward one end side and the uncoated portion 4b of the second electrode (the electrode 1b) protrudes toward the other end side. The electrode (for example, the electrode 1c) deposited between the first electrode (the electrode 1a) and the second electrode (the electrode 1b) may be arranged so that the uncoated portion 4b of this electrode protrudes toward the one end side (the electrode 1a side) or the other end side (the electrode 1b side).

When three or more electrodes 1 are transported side by side in the second direction D2, the cutting section 50 includes, for example, two or more pairs of cutters 51. Further, the unwinding section 11, the winding section 12, the first position correction section 14, and the second position correction section 15 are provided in the same number as the number of the electrodes. Using such an electrospinning apparatus 100A, a separator-integrated electrode can be manufactured in the same manner as the above method.

As described above, according to the embodiment, an electrospinning apparatus and a method for manufacturing a separator-integrated electrode capable of depositing the fiber 5 with a uniform thickness on a coated portion of the electrode are provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention. The above embodiments can be practiced in combination with each other.

What is claimed is:

1. A method for manufacturing a separator-integrated electrode including a separator, the method comprising:
   forming the separator by depositing a fiber on a first surface and a second surface of a plurality of electrodes while arranging the plurality of electrodes in a second direction orthogonal to a first direction and transporting the plurality of electrodes in a third direction orthogonal to the first direction and the second direction, the plurality of electrodes including a first electrode layer including the first surface, a second electrode layer including a second surface facing an opposite side to the first surface, and a current collector layer positioned between the first electrode layer and the second electrode layer in the first direction perpendicular to the first surface and the second surface; and pressurizing, by a pressurizing section, the plurality of electrodes including the fiber deposited, the plurality of electrodes including a coated portion and an uncoated portion, the current collector layer overlapping the first electrode layer and the second electrode layer in the first direction on the coated portion, the current collector layer not overlapping the first electrode layer and the second electrode layer in the first direction on the uncoated portion, the uncoated portion protruding from the coated portion toward one side in the second direction, the plurality of electrodes including a first electrode and a second electrode, the first electrode being positioned at one end in the second direction, the second electrode being positioned at other end in the second direction, in forming the separator, the first electrode being transported so that the uncoated portion of the first electrode protrudes toward the one end, and the second electrode being transported so that the uncoated portion of the second electrode protrudes toward the other end, the transporting the plurality of electrodes side by side so that the fiber is deposited over two adjacent electrodes of the plurality of electrodes, and the pressurizing section including a pair or more first press rollers sandwiching at least one of the plurality of electrodes and a pair or more second press rollers sandwiching the fibers that are deposited over the two adjacent electrodes.

2. An electrospinning apparatus depositing a fiber, the electrospinning apparatus comprising:

a transport section transporting a plurality of electrodes;

a fiber deposition section depositing the fiber on a first surface and a second surface of the plurality of electrodes, the plurality of electrodes being transported by the transport section, the second surface facing an opposite side to the first surface, and a pressurizing section pressurizing the plurality of electrodes including the fiber deposited, each of the plurality of electrodes including a first electrode layer including the first surface, a second electrode layer including the second surface, and a current collector layer positioned between the first electrode layer and the second electrode layer in a first direction perpendicular to the first surface and the second surface, the plurality of electrodes including a coated portion and an uncoated portion, the current collector layer overlapping the first electrode layer and the second electrode layer in the first direction on the coated portion, the current collector layer not overlapping the first electrode layer and the second electrode layer in the first direction on the uncoated portion, the uncoated portion protruding from the coated portion toward one side in a second direction orthogonal to the first direction, the transport section transporting the plurality of electrodes in a third direction in the fiber deposition section, the third direction being orthogonal to the first direction and the second direction, the plurality of electrodes being arranged in the second direction and including a first electrode and a second electrode, the first electrode being positioned at one end in the second direction, the second electrode being positioned at other end in the second direction, the first electrode being transported so that the uncoated portion of the first electrode protrudes toward the one end, the second electrode being transported so that the uncoated portion of the second electrode protrudes toward the other end, the transport section transporting the plurality of electrodes side by side so that the fiber is deposited over two adjacent electrodes of the plurality of electrodes in the fiber deposition section, and the pressurizing section including a pair or more first press rollers sandwiching at least one of the plurality of electrodes and a pair or more second press rollers sandwiching the fibers that are deposited over the two adjacent electrodes.

3. The electrospinning apparatus according to claim 2, further comprising: a cutting section cutting the fiber deposited over the two adjacent electrodes.

4. The electrospinning apparatus according to claim 2, wherein the transport section includes a position correction section correcting positions of the plurality of electrodes transported to the fiber deposition section.

5. The electrospinning apparatus according to claim 2, wherein the transport section transports the plurality of electrodes side by side so that a distance between the two adjacent electrodes in the fiber deposition section is equal to a thickness of the plurality of electrodes or larger than the thickness of the plurality of electrodes.

* * * * *